United States Patent
Ma et al.

(10) Patent No.: US 10,459,147 B2
(45) Date of Patent: Oct. 29, 2019

(54) DUAL SURFACE COLLIMATOR AND 3D ELECTRONIC DISPLAY EMPLOYING GRATING-BASED BACKLIGHTING USING SAME

(71) Applicant: LEIA INC., Menlo Park, CA (US)

(72) Inventors: Ming Ma, Palo Alto, CA (US); David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 87 days.

(21) Appl. No.: 15/894,565

(22) Filed: Feb. 12, 2018

(65) Prior Publication Data

US 2018/0164490 A1  Jun. 14, 2018

Related U.S. Application Data

(63) Continuation of application No. PCT/US2015/061417, filed on Nov. 18, 2015.

(60) Provisional application No. 62/214,975, filed on Sep. 5, 2015.

(51) Int. Cl.

| F21V 8/00 | (2006.01) |
| G02B 27/30 | (2006.01) |
| G02B 27/22 | (2018.01) |
| H04N 13/31 | (2018.01) |

(Continued)

(52) U.S. Cl.
CPC ......... *G02B 6/0031* (2013.01); *G02B 6/0036* (2013.01); *G02B 6/0038* (2013.01);
(Continued)

(58) Field of Classification Search
CPC .. G02B 6/0031; G02B 6/0036; G02B 6/0038; G02B 19/0028; G02B 27/22; G02B 27/225; G02B 27/30; H04N 13/31
(Continued)

(56) References Cited

U.S. PATENT DOCUMENTS

| 4,755,826 A | 7/1988 | Rao |
| 7,538,340 B2 * | 5/2009 | Pang .................... G02B 6/0031 |
| | | 257/13 |

(Continued)

FOREIGN PATENT DOCUMENTS

| KR | 20100030909 A | 3/2010 |
| TW | 201213731 A | 4/2012 |
| WO | 2014142851 A1 | 9/2014 |

OTHER PUBLICATIONS

International Search Report (ISR) from the International Searching Authority (ISA/KR) dated Jun. 3, 2016 (3 pages) for counterpart parent PCT Application No. PCT/US2015/061417.

*Primary Examiner* — Bryon T Gyllstrom
(74) *Attorney, Agent, or Firm* — J. Michael Johnson

(57) ABSTRACT

Dual-direction collimation and a dual surface collimator provide dual-direction collimated light at a non-zero propagation angle. The dual surface collimator includes an entrance surface and a reflector surface each having a curved shape. The entrance surface is configured to refract incident light and the reflector surface is configured to reflect the refracted light back toward the entrance surface. The entrance surface is further configured to re-reflect the reflected light by total internal reflection toward an output aperture. Curved shapes and relative orientation of the entrance and reflector surfaces, in combination, are configured to convert the incident light into dual-direction collimated light having the non-zero propagation angle. A three-dimensional (3D) display includes the dual surface collimator, a plate light guide and an array of multibeam diffraction gratings to provide a plurality of light beams corresponding to different 3D view of the display.

22 Claims, 7 Drawing Sheets

(51) Int. Cl.
*G02B 19/00* (2006.01)
*G02F 1/1335* (2006.01)

(52) U.S. Cl.
CPC ....... *G02B 6/0068* (2013.01); *G02B 19/0028* (2013.01); *G02B 27/22* (2013.01); *G02B 27/225* (2013.01); *G02B 27/30* (2013.01); *H04N 13/31* (2018.05); *G02F 1/133615* (2013.01); *G02F 2201/305* (2013.01); *G02F 2203/12* (2013.01)

(58) Field of Classification Search
USPC .......................................................... 362/609
See application file for complete search history.

(56) References Cited

U.S. PATENT DOCUMENTS

| | | | | |
|---|---|---|---|---|
| 8,702,287 | B2* | 4/2014 | Ohno | F21S 41/322 362/516 |
| 9,568,661 | B2* | 2/2017 | Ohno | G02B 6/0045 |
| 2004/0130882 | A1* | 7/2004 | Hara | G02B 6/0016 362/609 |
| 2006/0087860 | A1* | 4/2006 | Ishida | F21S 43/247 362/517 |
| 2006/0256578 | A1* | 11/2006 | Yang | G02B 6/0031 362/609 |
| 2006/0285347 | A1* | 12/2006 | Okada | F21S 41/143 362/516 |
| 2007/0211487 | A1 | 9/2007 | Sormani | |
| 2008/0260328 | A1* | 10/2008 | Epstein | G02B 6/0018 385/32 |
| 2010/0060817 | A1 | 11/2010 | Park et al. | |
| 2011/0305014 | A1 | 12/2011 | Peck | |
| 2013/0155723 | A1* | 6/2013 | Coleman | G02B 6/0018 362/621 |
| 2013/0308339 | A1 | 11/2013 | Woodgate et al. | |
| 2013/0314943 | A1 | 11/2013 | Huang | |
| 2014/0268867 | A1 | 9/2014 | Fiorentino et al. | |
| 2015/0036068 | A1 | 2/2015 | Fattal et al. | |

* cited by examiner

DUAL SURFACE COLLIMATOR AND 3D ELECTRONIC DISPLAY EMPLOYING GRATING-BASED BACKLIGHTING USING SAME

CROSS-REFERENCE TO RELATED APPLICATIONS

This application is a continuation patent application of and claims the benefit of priority to International Application No. PCT/US2015/061417, filed Nov. 18, 2015, which claims priority from U.S. Provisional Patent Application Ser. No. 62/214,975, filed Sep. 5, 2015, the entire contents of both are incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the applicability limitations of passive displays associated with light emission, many passive displays are coupled to an external light source. The coupled light source may allow these otherwise passive displays to emit light and function substantially as an active display. Examples of such coupled light sources are backlights. Backlights are light sources (often so-called 'panel' light sources) that are placed behind an otherwise passive display to illuminate the passive display. For example, a backlight may be coupled to an LCD or an EP display. The backlight emits light that passes through the LCD or the EP display. The light emitted by the backlight is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
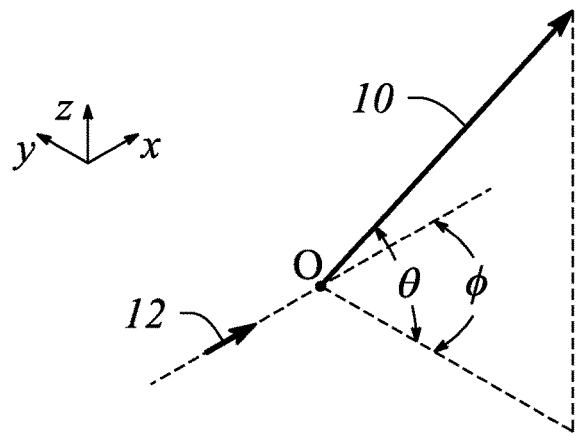
FIG. 1 illustrates a graphical view of angular components $\{\theta, \phi\}$ of a light beam having a particular principal angular direction, according to an example of the principles describe herein.

Certain examples have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide dual-direction collimation and display backlighting using the dual-direction collimation. In particular, embodiments of the principles described herein provide dual-direction light collimation using a collimator having both a curved entrance surface and a curved reflection surface. As such, the collimator is referred to herein as a 'dual surface' collimator. Light entering the dual surface collimator is refracted at the curved entrance surface and reflected at the curved reflection surface back toward the curved entrance surface. The reflected light is further reflected or 're-reflected' by total internal reflection at the curved entrance surface. The refraction, reflection and re-reflection of light according to a curved shape of each of the curved entrance surface and the curved reflection surface combine to convert or transform light entering the dual surface collimator into dual-direction collimated light at an output of the dual surface collimator. In addition, dual-direction collimation described herein may provide dual-direction collimated light having a predetermined, non-zero propagation angle in a vertical plane corresponding to the vertical direction or equivalently with respect to a horizontal plane.

According to various embodiments, light from a light source (e.g., a plurality of LEDs) may be coupled into the dual surface collimator at the curved entrance surface for dual-direction collimation. According to some embodiments, the dual-direction collimated light from the dual surface collimator may be coupled into a light guide (e.g., a plate light guide) of a backlight used in an electronic display. For example, the backlight may be a grating-based backlight including, but not limited to, a grating-based backlight having a multibeam diffraction grating. In some embodiments, the electronic display may be a three-dimensional (3D) electronic display used to display 3D information, e.g., an autostereoscopic or 'glasses free' 3D electronic display.

In particular, a 3D electronic display may employ a grating-based backlight having an array of multibeam diffraction gratings. The multibeam diffraction gratings may be used to couple light from a light guide and to provide coupled-out light beams corresponding to pixels of the 3D electronic display. For example, the coupled-out light beams may have different principal angular directions (also referred to as 'the differently directed light beams') from one another. According to some embodiments, these differently directed light beams produced by the multibeam diffraction grating may be modulated and serve as 3D pixels corresponding to 3D views of the 'glasses free' 3D electronic display to display 3D information. In these embodiments, the dual-direction collimation provided by the dual surface collimator may be used to produce output dual-direction collimated light that is substantially uniform (i.e., without striping) within the light guide. In turn, uniform illumination of the multibeam diffraction gratings may be provided, in accordance with the principles described herein.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar.

In some embodiments, a plate light guide may be substantially flat (i.e., confined to a plane) and so the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

According to various embodiments described herein, a diffraction grating (e.g., a multibeam diffraction grating) may be employed to scatter or couple light out of a light guide (e.g., a plate light guide) as a light beam. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the plurality of features (e.g., a plurality of grooves in a material surface) of the diffraction grating may be arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

In particular, a light beam produced by the multibeam diffraction grating has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multibeam diffraction grating) while the azimuth angle $\phi$ is an angle in a horizontal plane (e.g., parallel to the multibeam diffraction grating plane). FIG. 1 illustrates the angular components $\{\theta, \phi\}$ of a light beam 10 having a particular principal angular direction, according to an example of the principles describe herein. In addition, the light beam 10 is emitted or emanates from a particular point, by definition herein. That is, by definition, the light beam 10 has a central ray associated with a particular point of origin within the multibeam diffraction grating. FIG. 1 also illustrates the light beam point of origin O. An example propagation direction of incident light is illustrated in FIG. 1 using a bold arrow 12 directed toward the point of origin O.

According to various embodiments, characteristics of the multibeam diffraction grating and features (i.e., diffractive features) thereof, may be used to control one or both of the angular directionality of the light beams and a wavelength or color selectivity of the multibeam diffraction grating with respect to one or more of the light beams. The characteristics that may be used to control the angular directionality and wavelength selectivity include, but are not limited to, one or more of a grating length, a grating pitch (feature spacing), a shape of the features, a size of the features (e.g., groove width or ridge width), and an orientation of the grating. In some examples, the various characteristics used for control may be characteristics that are local to a vicinity of the point of origin of a light beam.

Further according to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3D) electronic display (also referred to as a multiview or 'holographic' electronic display or an autostereoscopic display). As such, the differently directed light beams produced by coupling out guided light from the light guide using the multibeam diffractive grating may be or represent '3D pixels' of the 3D electronic display. Further, the 3D pixels correspond to different 3D views or 3D view angles of the 3D electronic display.

Herein a 'collimating' reflector is defined as a reflector having a curved shape that is configured to collimate light reflected by the collimating reflector (e.g., a collimating mirror). For example, the collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). In some embodiments, the collimating reflector may be a continuous reflector (i.e., having a substantially smooth, continuous reflecting surface), while in other embodiments, the collimating reflector may comprise a Fresnel reflector or Fresnel mirror that provides light collimation. According to various embodiments, an amount of collimation provided by the collimating reflector may vary in a predetermined degree or amount from one embodiment to another. Further, the collimating reflector may be configured to provide collimation in one or both of two orthogonal directions (e.g., a vertical direction and a horizontal direction). That is, the collimating reflector may include a parabolic shape in one or both of two orthogonal directions, according to some embodiments.

Herein, a 'light source' is defined as a source of light (e.g., an apparatus or device that emits light). For example, the light source may be a light emitting diode (LED) that emits light when activated. The light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light. As such, a 'plurality of light sources of different colors' is explicitly defined herein as a set or group of light sources in which at least one of the light sources produces light having a color, or equivalently a wavelength, that differs from a color or wavelength of light produced by at least one other light source of the light source plurality. Moreover, the 'plurality of light sources of different colors' may include more than one light source of the same or substantially similar color as long as at least two light sources of the plurality of light sources are different color light sources (i.e., produce a color of light that is different between the at least two light sources). Hence, by definition herein, a plurality of light sources of different colors may include a first light source that produces a first color of light and a second light source that produces a second color of light, where the second color differs from the first color.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2:
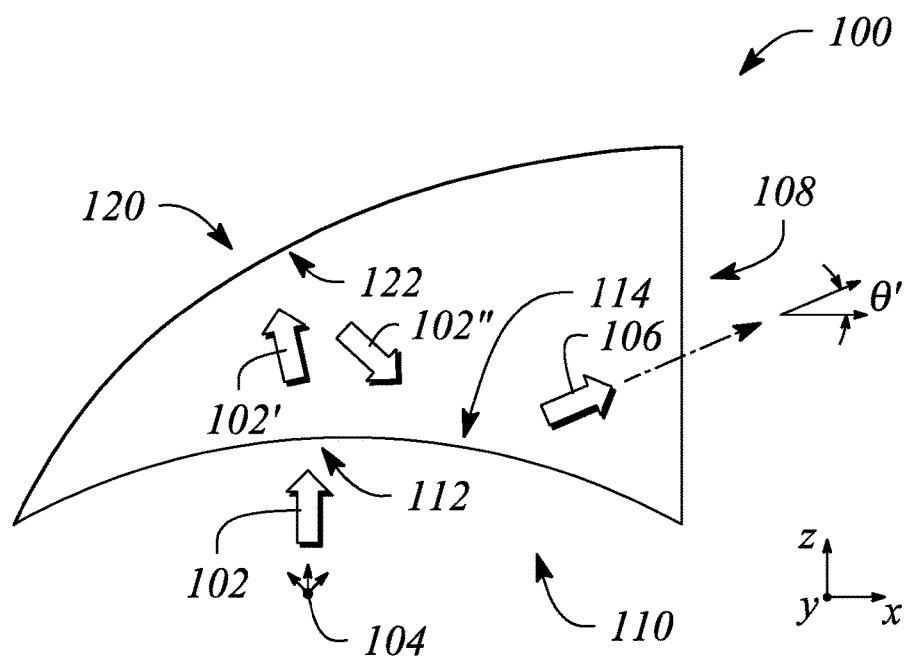
FIG. 2 illustrates a cross sectional view of a dual surface collimator in an example, according to an embodiment consistent with the principles described herein.

According to some embodiments of the principles described herein, a dual surface collimator is provided. FIG. 2 illustrates a cross sectional view of a dual surface collimator 100 in an example, according to an embodiment of the principles described herein. The dual surface collimator 100 is configured to receive light and to collimate the received light in or with respect to at least two different directions. In particular, the received light may be collimated in both a horizontal direction and a vertical direction, according to some embodiments.

In particular, the dual surface collimator 100 is configured to receive light 102 from a light source 104. As illustrated in FIG. 2, the light source 104 is external to the dual surface collimator 100, according to various embodiments. In some examples, the light 102 from the external light source 104 may be substantially uncollimated light, e.g., from a light source 104 that produces substantially uncollimated light. In another example, the light 102 may be provided by the external light source 104 as partially collimated light 102. For example, the light source 104 may include a lens or another collimation means to provide partially collimated light 102. As such, the light 102 received by the dual surface collimator 100 may be uncollimated or partially collimated light.

The illustrated dual surface collimator 100 is further configured to collimate the light 102 received from the external light source 104 using refractions and reflections described below to create collimated light 106 and to direct the collimated light 106 to an output or output aperture 108 of the dual surface collimator 100. The output aperture 108 may also be referred to as an output port, an output plane, an output surface, etc. of the dual surface collimator 100. The collimated light 106 provided at the dual surface collimator output aperture 108 is generally collimated or at least substantially collimated in at least two directions, according to various embodiments. As such, the collimated light 106 may be referred to as 'dual-direction' collimated light 106.

In particular, by definition herein, 'dual-direction' collimated light 106 is light that is collimated in two directions that are generally orthogonal to a propagation direction of the dual-direction collimated light 106. Further, the two collimation directions are mutually orthogonal to one another, by definition herein. For example, the dual-direction collimated light 106 may be collimated in or with respect to a horizontal direction (e.g., in a direction parallel to an x-y plane) and also in or with respect to a vertical direction (e.g., a z-direction). As such, the dual-direction collimated light 106 provided by the dual surface collimator 100 may be referred to as being both horizontally collimated and vertically collimated or equivalently collimated in both a horizontal direction and vertical direction by way of example and not limitation (e.g., since the horizontal and vertical directions may be determined relative to an arbitrary reference frame).

Further, according to various embodiments, the dual surface collimator 100 is further configured to provide the dual-direction collimated light 106 at the dual surface collimator output aperture 108 with a non-zero propagation angle θ', which is also further described below. As defined herein, a 'non-zero propagation angle' is an angle relative to a plane (e.g., the horizontal or x-y plane) or equivalently, relative to a surface of a light guide (e.g., a surface parallel to the horizontal plane). For example, the non-zero propagation angle θ' may be an angle relative to or defined with respect to a horizontal plane of the dual surface collimator 100. In some examples, the non-zero propagation angle θ' of the dual-direction collimated light 106 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle θ' may be about thirty (30) degrees. In other examples, the non-zero propagation angle θ' may be about 20 degrees, or about 25 degrees, or about 35 degrees. Further, according to some embodiments, the non-zero propagation angle θ' is both greater than zero and less than a critical angle of total internal reflection within a light guide, as described below.

As illustrated in FIG. 2, the dual surface collimator 100 comprises an entrance surface 110 having a curved shape. The curved entrance surface 110 is configured to refract light incident on the entrance surface 110 (i.e., incident from a z-direction, as illustrated). In particular, the entrance surface 110 may be configured to refract the incident light 102 from the light source 104, according to various embodiments. After being refracted by the entrance surface 110, the light becomes refracted light 102' propagating in the dual surface collimator 100.

FIG. 2 illustrates the incident light 102 as an arrow incident on the entrance surface 110 at a point of incidence 112 (i.e., a point at which the arrow corresponding to an incident light ray intersects the entrance surface 110). The refracted light 102' propagating away from the point of incidence 112 in the dual surface collimator 100 is also illustrated in FIG. 2 as another arrow. The arrows in FIG. 2 may represent a central ray of the light 102, 102', for example. In general, the incident light 102 comprises a plurality of rays of incident light 102, each light ray being incident on the entrance surface 110 at a different angle of incidence and at a different point of incidence 112. The refracted light 102' resulting from refraction of the plurality of incident light rays produces a similar plurality of rays of refracted light 102' within the dual surface collimator 100 propagating away from the point of incidence 112. Further, each refracted light ray propagating away from the entrance surface 110 has an angle of refraction that is determined by both the curved shape of the entrance surface 110 and an angle of incidence of a corresponding incident light ray.

According to various embodiments, the entrance surface 110 may comprise a curve formed in a surface of a material of the dual surface collimator 100. For example, the dual surface collimator 100 may comprise a material such as, but not limited to, a substantially optically transparent plastic or polymer (e.g., poly(methyl methacrylate) or 'acrylic glass', polycarbonate, etc.). In other examples, the dual surface collimator material into which the curve of the entrance surface 110 is formed may include, but is not limited to, one or more of various types of glass (e.g., silica glass, alkali-aluminosilicate glass, borosilicate glass, etc.).

In some embodiments, the curved shape (or simply 'curve') of the entrance surface 110 may be configured to spread light 102 from the light source 104, e.g., to evenly illuminate a reflector surface 120 (described below) of the dual surface collimator 100 with the refracted light 102'. In some embodiments, the curved shape of the entrance surface 110 may be configured to differentially refract light incident from a plurality of different light sources, e.g., light sources that produce different colors of light. In some embodiments, the curve of the entrance surface 110 may be configured to partially collimate the refracted light 102', e.g., collimate in a direction corresponding to a direction of the dual-direction collimated light 106 at the dual surface collimator output aperture 108. In some embodiments, the curved shape of the entrance surface 110 is further configured to modify a virtual position of the light source 104. The modified virtual position may be relative to a focal point of a reflector surface (e.g., the reflector surface 120) of the dual surface collimator 100, which is described below. According to some embodiments, the entrance surface 110 may have a so-called doubly curved shape. Herein, a 'doubly curved' shape or surface is defined as a shape or surface that is curved in both of two different directions (e.g., two directions that are orthogonal to one another). Similarly, a 'singly curved' shape or surface is defined as shape or surface that is curved in substantially one direction.

In various embodiments, a particular shape of the curve of the entrance surface 110 may be configured, e.g., adjusted, optimized or otherwise 'shaped', to enhance or tweak refraction characteristics thereof. For example, the curved shape of the entrance surface 110 may have either a so-called 'shaped cylindrical' profile or a so-called 'shaped spherical' profile that is configured or 'optimized' to provide a target refraction characteristic (e.g., refraction angle) of the entrance surface 110 (e.g., to provide light spreading, etc.). Further, the shaped spherical profile may be optimized, in some embodiments, to account for or to mitigate characteristics of the light source including, but not limited to, directional distortion or partial (albeit non-ideal or undesirable) collimation of the incident light 102 produced by the light source 104.

The dual surface collimator 100 illustrated in FIG. 2 further comprises a reflector surface 120 opposite to the entrance surface 110 that has another curved surface. By 'opposite' it is meant by definition herein that the reflector surface 120 is on or formed in another surface of the dual surface collimator material from that of the entrance surface 110. Further by definition, 'opposite' means that the reflector surface 120 is another surface of the dual surface collimator material positioned to receive the refracted light 102' from the entrance surface 110. FIG. 2 illustrates an example of the opposite position of the reflector surface 120 relative to the entrance surface 110, by way of example and not limitation.

According to various embodiments, the reflector surface 120 is configured to reflect the refracted light 102'. In particular, the reflector surface 120 is configured to reflect each ray of the refracted light 102' at a point of reflection 122. Further, the reflector surface 120 is configured to reflect the refracted light 102' back toward the entrance surface 110 as reflected light 102". FIG. 2 illustrates the reflected light 102" as an arrow pointing away from the reflector surface 120 toward the entrance surface 110.

In some embodiments, the curved shape of the reflector surface 120 may have a parabolic shape or a substantially parabolic shape (or profile). In various embodiments, a particular shape of the curve (e.g., the parabolic shape) of the reflector surface 120 may be configured, e.g., adjusted, optimized or otherwise 'shaped', to enhance or tweak reflection characteristics thereof. For example, the curved shape of the reflector surface 120 may have a so-called 'shaped parabolic' profile that is 'optimized' or configured to provide a target reflection characteristic (e.g., reflection angle) of the reflector surface 120 (e.g., to provide light spreading, etc.). As such, the curved shape of the reflector surface 120 may vary from one point of reflection 122 to another along the reflector surface 120. According to some embodiments, the reflector surface 120 may have a doubly curved shape (e.g., curved in both of two orthogonal directions). For example, the reflector surface 120 may be a doubly curved, shaped parabolic surface.

According to some embodiments, the reflector surface 120 may be metalized or otherwise coated with a reflective material to provide the optical reflection. Thus, the points of reflection 122 may include the reflective coating, according to some embodiments. Reflective materials used to coat the parabolic-shaped surface of the reflector surface 120 may include, but are not limited to, aluminum, chromium, nickel, silver or gold, for example. In other embodiments, reflection at the point of reflection 122 by the reflector surface 120 may be provided by a change in a refractive index between a material of the dual surface collimator 100 and a material such as, but not limited to, air outside (i.e., beyond the reflector surface 120) of the dual surface collimator 100.

In some embodiments, the reflector surface 120 may further include a tilt angle (i.e., the reflector surface 120 may be tilted at the tilt angle). The tilt angle may be configured to provide the non-zero propagation angle $\theta'$ of the dual-direction collimated light 106 or a portion thereof, for example. In yet another example, the tilt angle may be provided or further provided by a shift in a location of the light source 104 that provides the incident light 102 relative to a focus of the curved reflector surface 120 (e.g., as imaged by the curved entrance surface).

Referring again to FIG. 2 and specifically to the entrance surface 110, according to various embodiments, the entrance surface 110 is further configured to re-reflect the reflected light 102" toward the output aperture 108 of the dual surface collimator 100. In particular, the reflected light 102" may be re-reflected by or at the entrance surface 110 according to total internal reflection (TIR). Moreover, the re-reflected light 102" from the entrance surface 110 is re-reflected in a direction toward the output aperture 108 as the dual-direction collimated light 106. Note that, unlike the reflector surface 120, the entrance surface 110 generally does not include a reflective coating, according to various embodiments. In particular, re-reflection by TIR occurs at an interior side 114 of the entrance surface 110 as a result of a refractive index difference across a boundary between the material of the dual surface collimator 100 and a material (e.g., air) outside of the dual surface collimator 100, according to various embodiments.

According to various embodiments, the dual surface collimator 100 is configured such that each of refraction and re-reflection at the entrance surface 110 along with reflection at the reflector surface 120 act together to convert the incident light 102 into the dual-direction collimated light 106, according to various embodiments. In particular, the curved shapes and a relative orientation of the entrance surface 110 and the reflector surface 120 in combination are configured to convert the incident light 102 into dual-direction collimated light 106 at the output aperture 108, according to various embodiments. Thus, the curves and orientations of the entrance surface 110 and the reflector surface 120 may be substantially arbitrary as long as the refraction of the incident light 102 by the curved shape of the entrance surface 110, the reflection of the refracted light 102' by the curved shape reflector surface 120, and the re-reflection of the reflected light 102" by the curved shape of the entrance surface 110 by TIR, provide the dual-direction collimated light 106 at the output aperture 108.

According to some embodiments, the various curves of the entrance and reflector surfaces 110, 120 may be realized by simultaneous optimization in a simulation of the dual surface collimator 100. For example, a ray tracing simulation may be used in conjunction with an optimization to adjust or tweak the various curves. The optimization may be terminated when simulated incident light 102 is converted into simulated dual-direction collimated light 106 at the output aperture 108, according to the ray tracing simulation. Further, the various curves or curved shapes may be adjusted or tweaked during the optimization to realize a simulated non-zero propagation angle θ' of the dual-collimated light 106, e.g., the non-zero propagation angle being relative to a horizontal plane.

In some embodiments, the curve or curved shape of the entrance surface 110 is configured to substantially extend from adjacent to an end of the reflector surface 120 to adjacent a surface or boundary representing the output aperture 108 of the dual surface collimator 100. For example, the curve of the entrance surface 110 may comprise greater than about thirty percent (30%), or greater than about fifty percent (50%), or greater than about seventy percent (70%) or greater than about ninety percent (90%) of the entrance surface between the reflector surface 120 and the output aperture 108. FIG. 2 illustrates the entrance surface curve extending substantially from adjacent to one end of the reflector surface 120 to adjacent to one end of the output aperture 108 to represent about one hundred percent (100%) of the entrance surface 110, for example.

Figure 3:
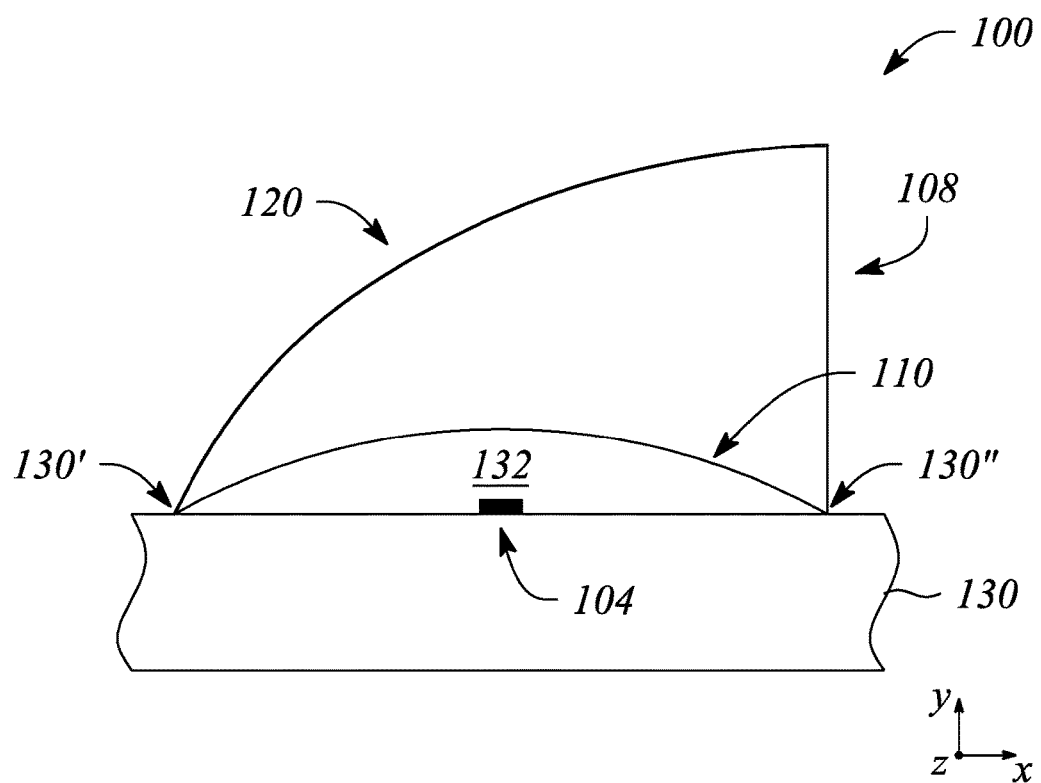
FIG. 3 illustrates a cross sectional view of a portion of a dual surface collimator including a curved entrance surface in an example, according to an embodiment consistent with the principles described herein.

In some embodiments, the curved shape of the entrance surface 110 may be further configured to form a cavity (e.g., the curved shape may be a concave curved shape) that may enclose the light source 104, for example. FIG. 3 illustrates a cross sectional view of a portion of a dual surface collimator 100 including a curved entrance surface 110 in an example, according to an embodiment consistent with the principles described herein. As illustrated, the dual surface collimator 100 is in contact with a substrate 130, e.g., at contact points 130', 130" at ends of the curved entrance surface 110 adjacent to the reflector surface 120 and output aperture 108, respectively. Further, the light source 104 is mounted to the substrate, in some examples. As illustrated, the curved shape of the entrance surface 110 is configured to form a cavity 132 between the curved entrance surface 110 and the substrate 130, bounded by the contact points 130', 130". Moreover, the cavity 132 is configured to substantially enclose the light source 104 on the substrate 130. The cavity 132 may enclose the light source 104 to provide protection to the light source 104, for example. In particular, the light source 104 may comprise a light emitting diode (LED) that is mounted to the surface of the substrate 130, in some embodiments. Enclosure of the surface-mounted LED by the cavity 132 formed by the curved shape of the entrance surface 110 may provide protection including, but not limited to, mechanical abrasion protection and environmental protection (e.g., protection from moisture, debris, etc.), for example.

Figure 4A:
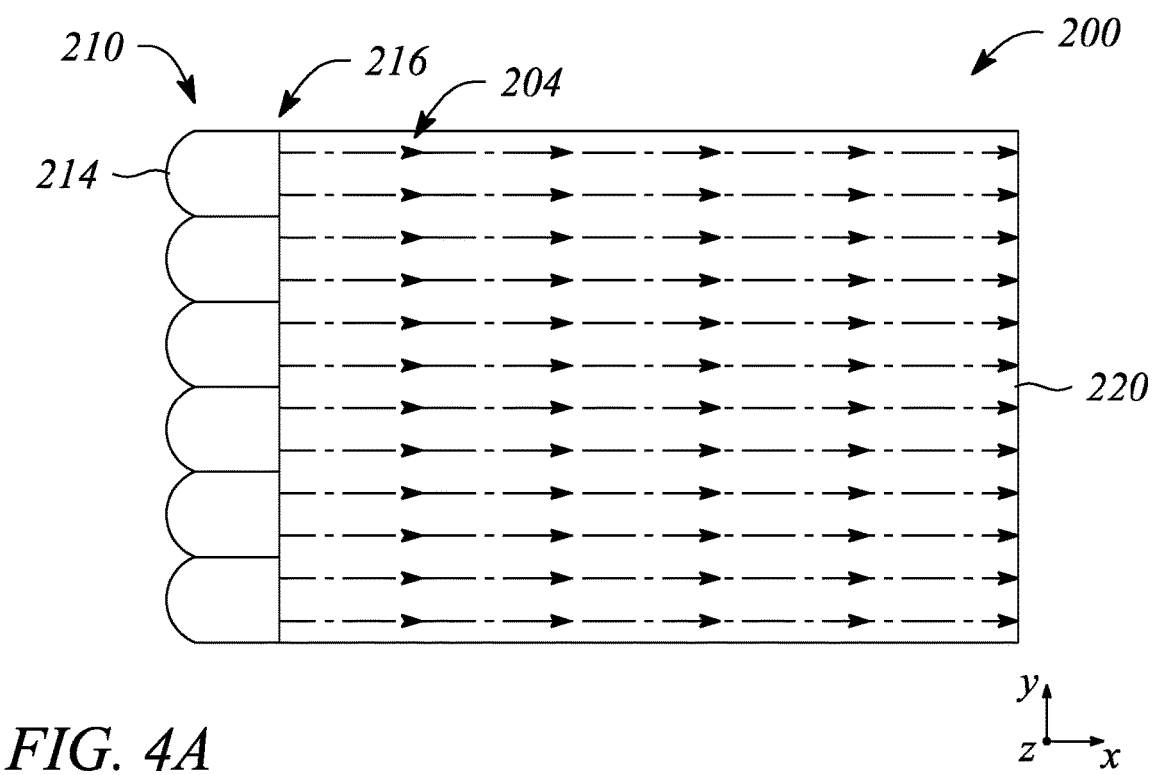
FIG. 4A illustrates a top view of a backlight in an example, according to an embodiment consistent with the principles described herein.
Figure 4B:
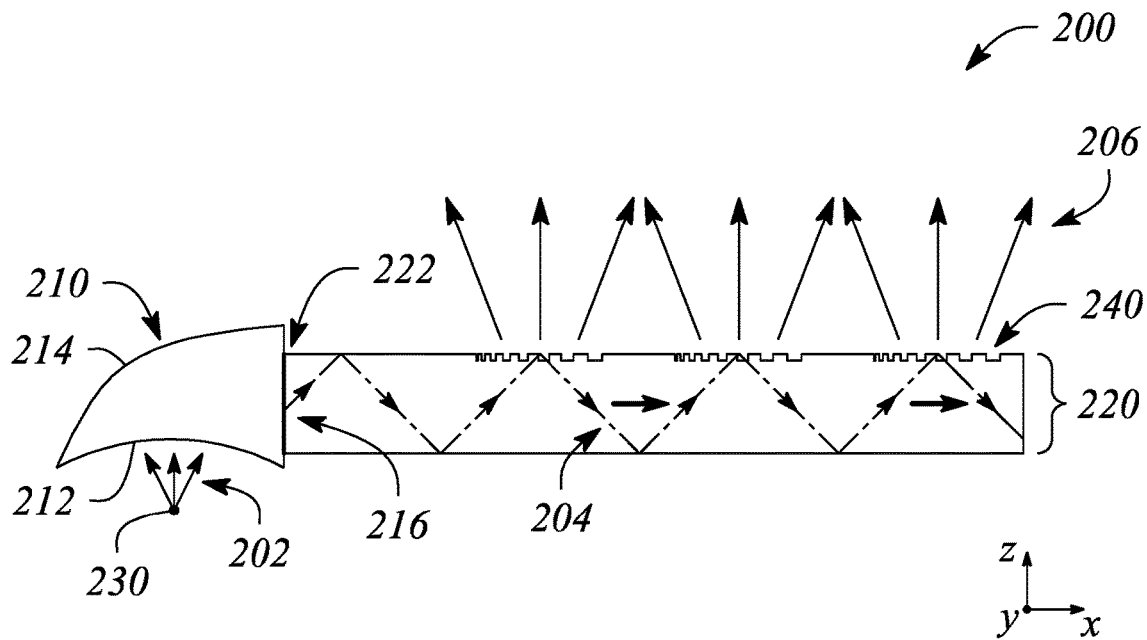
FIG. 4B illustrates a cross sectional view of a backlight in an example, according to an embodiment consistent with the principles described herein.
Figure 4C:
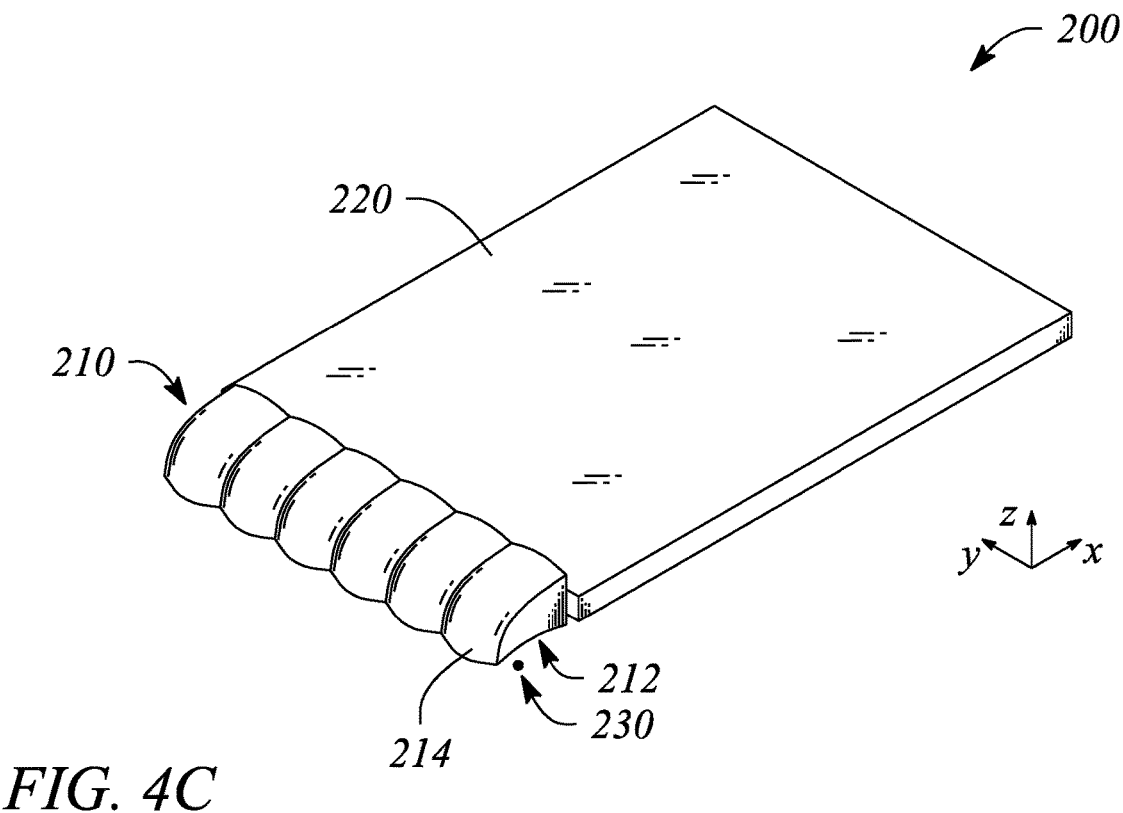
FIG. 4C illustrates a cross sectional view of an alignment between an output aperture of a dual surface collimator and an input aperture of a plate light guide in an example, according to an embodiment consistent with the principles described herein.

According to some embodiments of the principles described herein, a backlight employing dual-direction collimation is provided. FIG. 4A illustrates a top view of a backlight 200 in an example, according to an embodiment consistent with the principles of the principles described herein. FIG. 4B illustrates a cross sectional view of a backlight 200 in an example, according to an embodiment consistent with the principles of the principles described herein. FIG. 4C illustrates a perspective view of a backlight 200 in an example, according to an embodiment consistent with the principles described herein.

As illustrated in FIGS. 4A-4C, the backlight 200 comprises a dual surface collimator 210. In some embodiments, the dual surface collimator 210 may be substantially similar to the dual surface collimator 100 described above. In particular, the dual surface collimator 210 (e.g., as illustrated in FIG. 4B) comprises an entrance surface 212 and a reflector surface 214, each of which may be substantially similar to respective ones of the entrance surface 110 and the reflector surface 120 of the dual surface collimator 100, in some embodiments. For example, FIG. 4A illustrates a plurality of reflector surfaces 214 of the dual surface collimator 210, as viewed from the top. Each reflector surface 214 of the plurality may be substantially similar to the reflector surface 120, for example. Moreover, the reflector surface 214 illustrated in FIGS. 4A-4C may represent a doubly curved shaped reflector (e.g., a shaped parabolic reflector), for example. The entrance surface 212, e.g., illustrated in the cross sectional view of FIG. 4B, may be substantially similar to the entrance surface 110 of FIG. 2, in some examples. In some embodiments, the entrance surface 212 may comprise a plurality of entrance surfaces, where each entrance surface 212 of the entrance surface plurality is configured to direct light to a corresponding reflector surface 214 of the reflector surface plurality. Each entrance surface 212 of the plurality may have a separate, doubly curved shape (e.g., separate spherical shapes for each entrance surface 212), for example. In other embodiments, the entrance surface 212 is a substantially continuous curved surface that spans a length of the plurality of reflector surfaces 214. For example, the entrance surface 212 may be a singly curved, substantially continuous, cylindrically shaped surface spanning a width of the dual surface collimator 210 (i.e., in a y-direction, as illustrated).

Referring to FIG. 4B, according to various embodiments, the dual surface collimator 210 is configured to receive light 202 (e.g., from a light source 230, described below), and provide dual-direction collimated light 204 at an output 216 of the dual surface collimator 210. Further, the dual surface collimator 210 is configured to provide the dual-direction collimated light 204 having a non-zero propagation angle relative to the horizontal x-y plane at the dual surface collimator output 216, according to various embodiments. In some embodiments, the dual-direction collimated light 204 provided by the dual surface collimator 210 may be substantially similar to the dual-direction collimated light 106 provided by the dual surface collimator 100, as described above.

The illustrated backlight 200 further comprises a plate light guide 220 coupled (e.g., optically coupled) to the output 216 of the dual surface collimator 210. The plate light guide 220 is configured to receive and to guide the dual-direction collimated light 204 at the non-zero propagation angle. In particular, the plate light guide 220 may receive the dual-direction collimated light 204 at an input end or equivalently an input aperture of the plate light guide 220. According to various embodiments, the plate light guide 220 is further configured to emit a portion of the guided, dual-direction collimated light 204 from a surface of the plate light guide 220. In FIG. 4B, emitted light is illustrated as a plurality of rays (arrows) extending away from the plate light guide surface.

In some embodiment, the plate light guide 220 may be a slab or plate optical waveguide comprising an extended, planar sheet of substantially optically transparent, dielectric material. The planar sheet of dielectric material is configured to guide the dual-direction collimated light 204 from the dual surface collimator 210 as a guided light beam using total internal reflection. The dielectric material may have a first refractive index that is greater than a second refractive index of a medium surrounding the dielectric optical waveguide. The difference in refractive indices is configured to facilitate total internal reflection of the guided light beam according to one or more guided modes of the plate light guide 220.

According to various examples, the substantially optically transparent material of the plate light guide 220 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the plate light guide 220 may further include a cladding layer (not illustrated) on at least a portion of a surface (e.g., one or both of the top surface and the bottom surface) of the plate light guide 220. The cladding layer may be used to further facilitate total internal reflection, according to some examples.

In some embodiments, (e.g., as illustrated in FIG. 4A), the plate light guide 220 may be integral to the dual surface collimator 210. In particular, the plate light guide 220 and the dual surface collimator 210 may be formed from and thus comprise the same material. For example, the plate light guide 220 may be an extension of the output 216 (or output aperture) of the dual surface collimator 210. In other embodiments (e.g., as illustrated in FIG. 4B), the dual surface collimator 210 and the plate light guide 220 are separate, and a glue or adhesive layer, another interface material or even air between the output 216 and the input of the plate light guide 220 provides coupling (e.g., one or both of optical coupling and mechanical coupling) of the dual surface collimator 210 and the plate light guide 220. For example, the dual surface collimator 210 may comprise a polymer or plastic material and the plate light guide 220 may comprise glass. The dual surface collimator 210 and the plate light guide 220 may be affixed to one another using a suitable adhesive layer 222 (e.g., an optically matched glue) therebetween, for example as illustrated in FIG. 4B.

According to some embodiments, the backlight 200 may further comprise the light source 230. The light source 230 is configured to provide light 202 to the dual surface collimator 210. In particular, the light source 230 is located adjacent to (e.g., below, as illustrated in FIGS. 4B-4C) the entrance surface 212 of the dual surface collimator 210 and is configured to provide the light 202 incident on the entrance surface curved shape. In various embodiments, the light source 230 may comprise substantially any source of light including, but not limited to, one or more light emitting diodes (LEDs). In some embodiments, the light source 230 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In some embodiments, the light source 230 may comprise a plurality of different optical sources configured to provide different colors of light. The different optical sources may be offset from one another, for example. The offset of the different optical sources may be configured to provide different, color-specific, non-zero propagation angles of the dual-direction collimated light 204 corresponding to each of the different colors of light, according to some embodiments. In particular, the offset may add an additional non-zero propagation angle component to the non-zero propagation angle provided by the dual surface collimator 210, for example. In some embodiments, the light source 104 described above with respect to the dual surface collimator 100 and the light source 230 may be substantially similar.

In some embodiments, a vertical extent of the output 216 of the dual surface collimator 210 is greater than a vertical extent of an input aperture of the plate light guide 220. According to some embodiments, an alignment between the plate light guide input aperture and the dual surface collimator output 216 may be configured to adjust a characteristic of the dual-direction collimated light 204 that is coupled into the plate light guide 220 at the input aperture. For example, an intensity of the dual-direction collimated light 204 that is coupled into the plate light guide 220 may be adjusted by selecting a particular alignment (i.e., vertical position of the plate light guide 220 relative to the dual surface collimator 210). In another example, a relative amount of various colors of the dual-direction collimated light 204 coupled into the plate light guide 220 may be controlled by the alignment. In particular, when the dual-direction collimated light 204 includes different colors of light at different, color-specific, non-zero propagation angles, the aperture alignment may be used to control a relative amount of each of the different colors by virtue of these different, color-specific, non-zero propagation angles.

Figure 4D:
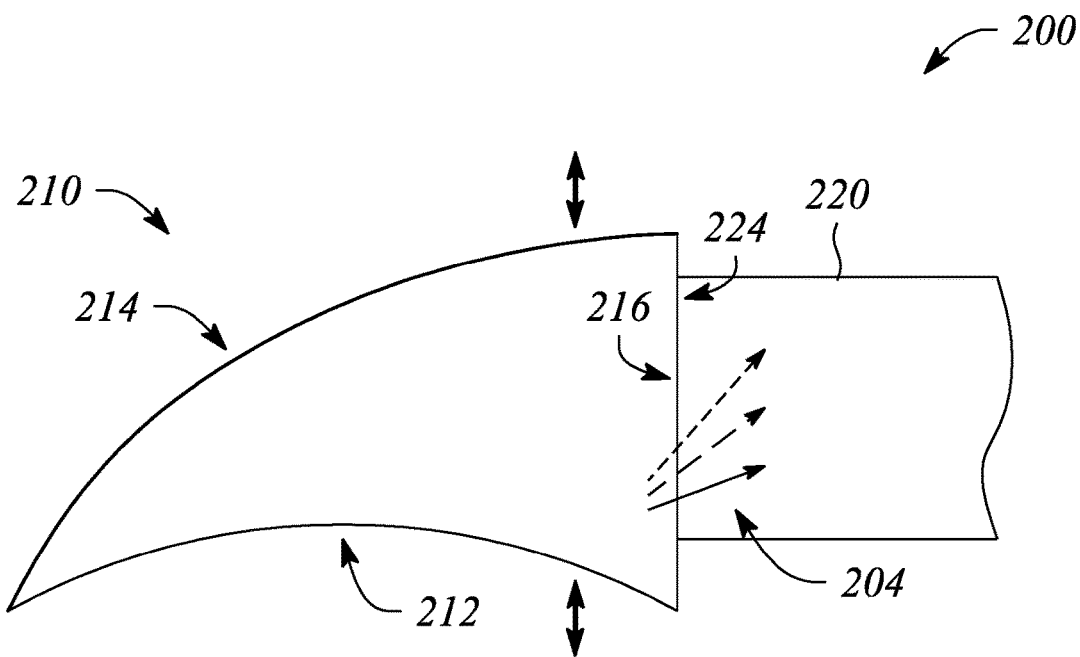
FIG. 4D illustrates a cross sectional view of an alignment between an output aperture of a dual surface collimator and an input aperture of a plate light guide in an example, according to an embodiment consistent with the principles described herein.

FIG. 4D illustrates a cross sectional view of an alignment between an output 216 of a dual surface collimator 210 and an input aperture 224 of a plate light guide 220 in an example, according to an embodiment consistent with the principles described herein. In particular, FIG. 4D illustrates the dual surface collimator output 216 having a vertical extent that is greater than a vertical extent of the plate light guide input aperture 224. Bold double-headed arrows illustrate adjustment (e.g., up or down) of the alignment between output 216 and input aperture 224, respectively. Three extended arrows (e.g., having a solid line, a large dashed line, and a small dashed line) illustrate three different colors of dual-direction collimated light 204 propagating at three different, color-specific, non-zero propagation angles. Selection of a particular alignment or equivalently a particular vertical position of the plate light guide input aperture 224 relative to the output 216 of the dual surface collimator 210 may influence a relative amount of each of the three different colors of dual-direction collimated light that is coupled into the plate light guide 220, according to various embodiments.

According to some embodiments (e.g., as illustrated in FIG. 4B), the backlight 200 may further comprise a multibeam diffraction grating 240 at a surface of the plate light guide 220. The multibeam diffraction grating 240 is configured to diffractively couple out a portion of the guided, dual-direction collimated light 204 from the plate light guide 220 as a plurality of light beams 206. The plurality of light beams 206 (i.e., the plurality of rays (arrows) illustrated in FIG. 4B) represents the emitted light. In various embodiments, a light beam 206 of the light beam plurality has a principal angular direction that is different from principal angular directions of other light beams 206 of the light beam plurality.

In some embodiments, the multibeam diffraction grating 240 is a member of or is arranged in an array of multibeam diffraction gratings 240. In some embodiments, the backlight 200 is a backlight of a three-dimensional (3D) electronic display and the principal angular direction of the light beam 206 corresponds to a view direction of the 3D electronic display.

Figure 5A:
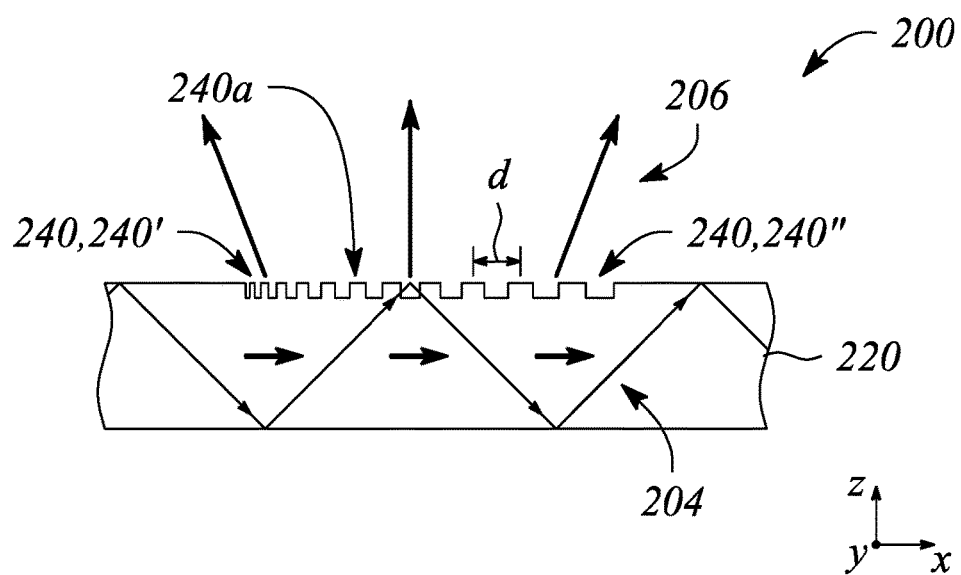
FIG. 5A illustrates a cross sectional view of a portion of a backlight with a multibeam diffraction grating in an example, according to an embodiment consistent with the principles described herein.
Figure 5B:
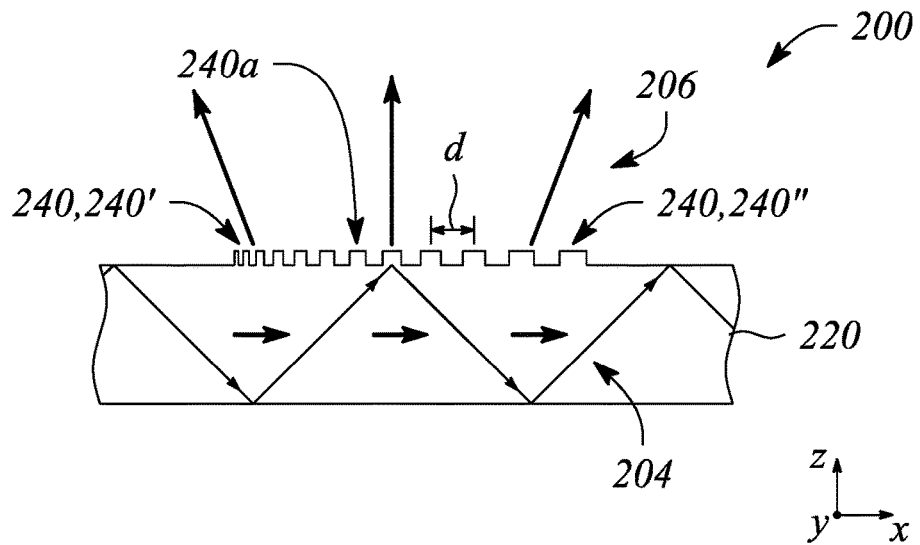
FIG. 5B illustrates a cross sectional view of a portion of a backlight with a multibeam diffraction grating in an example, according to another embodiment consistent with the principles described herein.
Figure 5C:
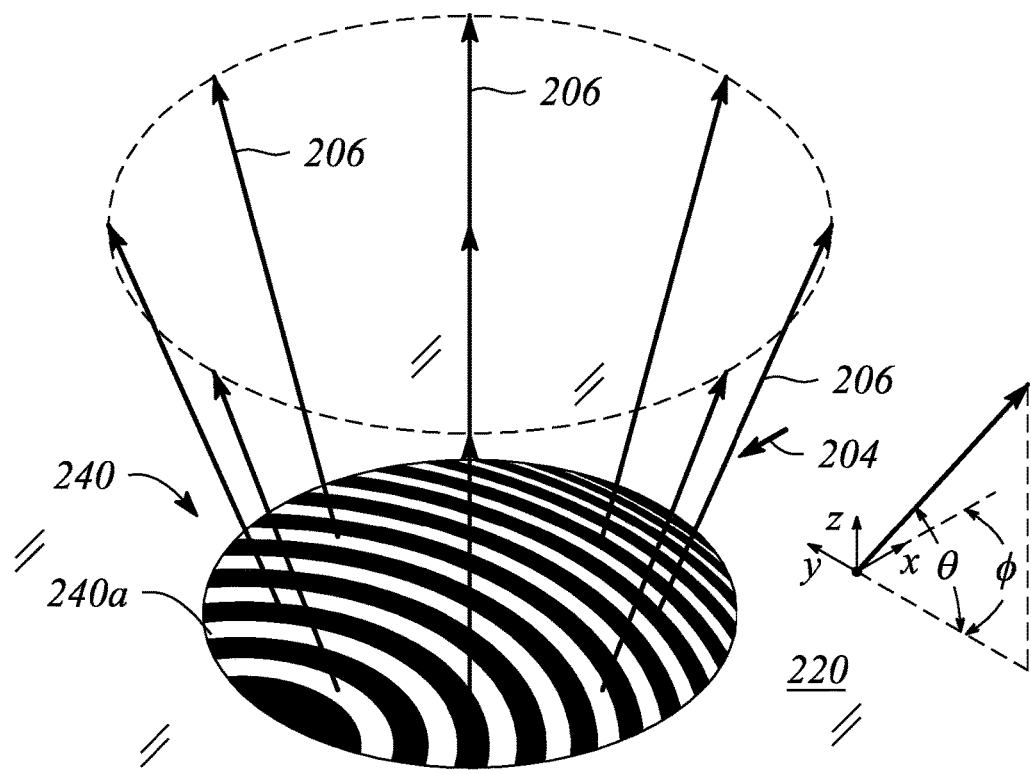
FIG. 5C illustrates a perspective view of the backlight portion of either FIG. 5A or FIG. 5B including the multibeam diffraction grating in an example, according to an embodiment consistent with the principles described herein.

FIG. 5A illustrates a cross sectional view of a portion of a backlight 200 with a multibeam diffraction grating 240 in an example, according to an embodiment consistent with the principles described herein. FIG. 5B illustrates a cross sectional view of a portion of a backlight 200 with a multibeam diffraction grating 240 in an example, according to another embodiment consistent with the principles described herein. FIG. 5C illustrates a perspective view of the backlight portion of either FIG. 5A or FIG. 5B including the multibeam diffraction grating 240 in an example, according to an embodiment consistent with the principles described herein. The multibeam diffraction grating 240 illustrated in FIG. 5A comprises grooves in a surface of the plate light guide 220, by way of example and not limitation. FIG. 5B illustrates the multibeam diffraction grating 240 comprising ridges protruding from the plate light guide surface.

As illustrated in FIGS. 5A-5B, the multibeam diffraction grating 240 is a chirped diffraction grating. In particular, the diffractive features 240a are closer together at a first end 240' of the multibeam diffraction grating 240 than at a second end 240". Further, the diffractive spacing d of the illustrated diffractive features 240a varies from the first end 240' to the second end 240". In some embodiments, the chirped diffraction grating of the multibeam diffraction grating 240 may have or exhibit a chirp of the diffractive spacing d that varies linearly with distance. As such, the chirped diffraction grating of the multibeam diffraction grating 240 may be referred to as a 'linearly chirped' diffraction grating.

In another embodiment, the chirped diffraction grating of the multibeam diffraction grating 240 may exhibit a non-linear chirp of the diffractive spacing d. Various non-linear chirps that may be used to realize the chirped diffraction grating include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be used in the multibeam diffraction grating 240.

As illustrated in FIG. 5C, the multibeam diffraction grating 240 includes diffractive features 240a (e.g., grooves or ridges) in, at or on a surface of the plate light guide 220 that are both chirped and curved (i.e., the multibeam diffraction grating 240 is a curved, chirped diffraction grating, as illustrated). The dual-direction collimated light 204 as the guided light beam guided in the plate light guide 220 has an incident direction relative to the multibeam diffraction grating 240 and the plate light guide 220, as illustrated by a bold arrow in FIGS. 5A-5C. Also illustrated is the plurality of coupled-out or emitted light beams 206 pointing away from the multibeam diffraction grating 240 at the surface of the plate light guide 220. The illustrated light beams 206 are emitted in a plurality of different predetermined principal angular directions. In particular, the different predetermined principal angular directions of the emitted light beams 206 are different in both azimuth and elevation (e.g., to form a light field).

According to various examples, both the predefined chirp of the diffractive features 240a and the curve of the diffractive features 240a may be responsible for a respective plurality of different predetermined principal angular directions of the emitted light beams 206. For example, due to the diffractive feature curve, the diffractive features 240a within the multibeam diffraction grating 240 may have varying orientations relative to an incident direction of the guided light beam within the plate light guide 220. In particular, an orientation of the diffractive features 240a at a first point or location within the multibeam diffraction grating 240 may differ from an orientation of the diffractive features 240a at another point or location relative to the guided light beam incident direction. With respect to the coupled-out or emitted light beam 206, an azimuthal component $\phi$ of the principal angular direction $\{\theta, \phi\}$ of the light beam 206 may be determined by or correspond to the azimuthal orientation angle $\phi_f$ of the diffractive features 240a at a point of origin of the light beam 206 (i.e., at a point where the incident guided light beam is coupled out). As such, the varying orientations of the diffractive features 240a within the multibeam diffraction grating 240 produce different light beams 206 having different principal angular directions $\{\theta, \phi\}$, at least in terms of their respective azimuthal components $\phi$.

In particular, at different points along the curve of the diffractive features 240a, an 'underlying diffraction grating' of the multibeam diffraction grating 240 associated with the curved diffractive features 240a has different azimuthal orientation angles $\phi_f$. By 'underlying diffraction grating', it is meant that diffraction gratings of a plurality of non-curved diffraction gratings in superposition yield the curved diffractive features 240a of the multibeam diffraction grating 240. Thus, at a given point along the curved diffractive features 240a, the curve has a particular azimuthal orientation angle $\phi_f$ that generally differs from the azimuthal orientation angle $\phi_f$ at another point along the curved diffractive features 240a. Further, the particular azimuthal orientation angle $\phi_f$ results in a corresponding azimuthal component $\phi$ of a principal angular direction $\{\theta, \phi\}$ of a light beam 206 emitted from the given point. In some examples, the curve of the diffractive features 240a (e.g., grooves, ridges, etc.) may represent a section of a circle. The circle may be coplanar with the light guide surface. In other examples, the curve may represent a section of an ellipse or another curved shape, e.g., that is coplanar with the plate light guide surface.

In other embodiments, the multibeam diffraction grating 240 may include diffractive features 240a that are 'piecewise' curved. In particular, while the diffractive feature 240a may not describe a substantially smooth or continuous curve per se, at different points along the diffractive feature 240a within the multibeam diffraction grating 240, the diffractive feature 240a still may be oriented at different angles with respect to the incident direction of the guided light beam of the dual-direction collimated light 204. For example, the diffractive feature 240a may be a groove including a plurality of substantially straight segments, each segment having a different orientation than an adjacent segment. Together, the different angles of the segments may approximate a curve (e.g., a segment of a circle), according to various embodiments. In yet other examples, the diffractive features 240a may merely have different orientations relative to the incident direction of the guided light at different locations within the multibeam diffraction grating 240 without approximating a particular curve (e.g., a circle or an ellipse).

In some embodiments, the grooves or ridges that form the diffractive features 240a may be etched, milled or molded into the plate light guide surface. As such, a material of the multibeam diffraction gratings 240 may include the material of the plate light guide 220. As illustrated in FIG. 5B, for example, the multibeam diffraction grating 240 includes ridges that protrude from the surface of the plate light guide 220, wherein the ridges may be substantially parallel to one another. In FIG. 5A (and FIG. 4B), the multibeam diffraction grating 240 includes grooves that penetrate the surface of the plate light guide 220, wherein the grooves may be substantially parallel to one another. In other examples (not illustrated), the multibeam diffraction grating 240 may comprise a film or layer applied or affixed to the light guide surface. The plurality of light beams 206 in different principal angular directions provided by the multibeam diffraction gratings 240 are configured to form a light field in a viewing direction of an electronic display. In particular, the backlight 200 employing dual-direction collimation is configured to provide information, e.g., 3D information, corresponding to pixels of an electronic display.

Figure 6:
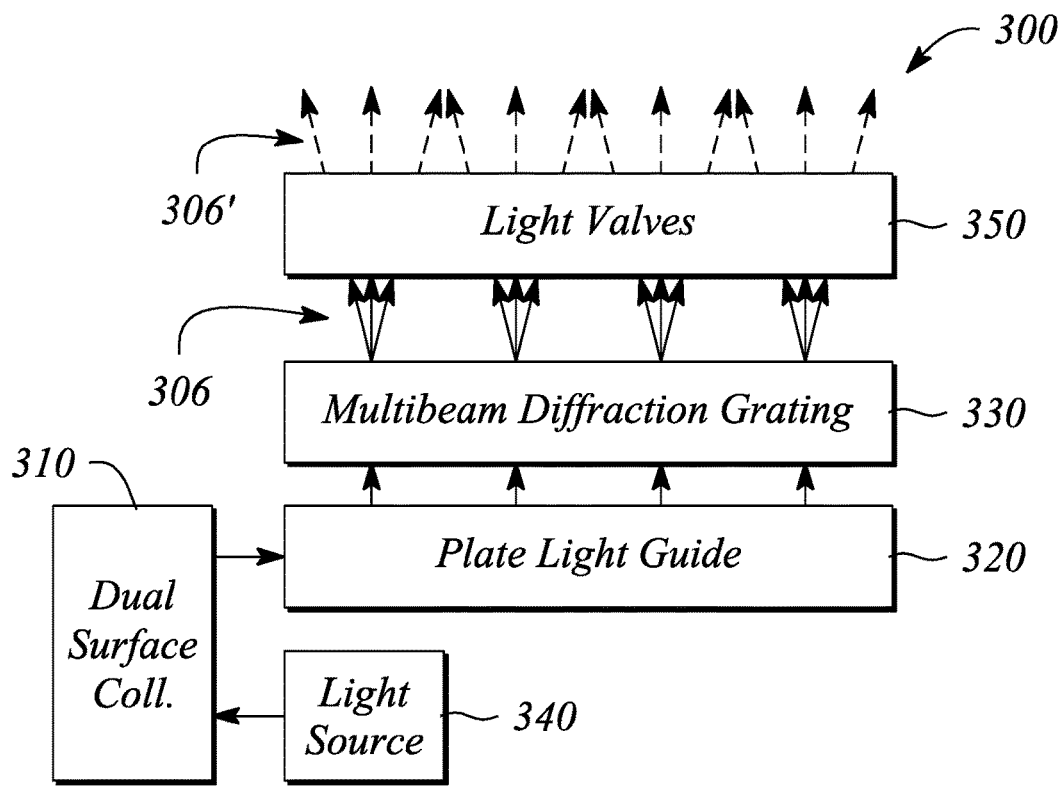
FIG. 6 illustrates a block diagram of a three-dimensional (3D) electronic display in an example, according to an embodiment of the principles described herein.

In accordance with some embodiments of the principles described herein, a three-dimensional (3D) electronic display is provided. FIG. 6 illustrates a block diagram of a three-dimensional (3D) electronic display 300 in an example, according to an embodiment of the principles described herein. The 3D electronic display 300 is configured to produce directional light comprising light beams having different principal angular directions and, in some embodiments, also having a plurality of different colors. For example, the 3D electronic display 300 may provide or generate a plurality of different light beams 306 directed out and away from the 3D electronic display 300 in different predetermined principal angular directions (e.g., as a light field). Further, the different light beams 306 may include light beams 306 of or having different colors of light. In turn, the light beams 306 of the plurality may be modulated as modulated light beams 306' to facilitate the display of information including color information (e.g., when the light beams 306 are color light beams), according to some embodiments.

In particular, the modulated light beams 306' having different predetermined principal angular directions may form a plurality of pixels of the 3D electronic display 300. In some embodiments, the 3D electronic display 300 may be a so-called 'glasses free' 3D color electronic display (e.g., a multiview, 'holographic' or autostereoscopic display) in which the light beams 306' correspond to pixels associated with different 'views' of the 3D electronic display 300. Modulated light beams 306' are illustrated using dashed line arrows in FIG. 6, while the different light beams 306 prior to modulation are illustrated as solid line arrows, by way of example.

The 3D electronic display 300 illustrated in FIG. 6 comprises a dual surface collimator 310 (abbreviated as 'Dual Surface Coll.' in FIG. 6). The dual surface collimator 310 is configured to provide dual-direction collimated light having both vertical collimation and horizontal collimation. In particular, the vertical and horizontal collimation is with respect to a vertical direction (e.g., z-direction) or a vertical plane (e.g., y-z plane) and a horizontal direction (e.g., x-direction) or a horizontal plane (x-y plane) of the dual surface collimator 310. Further, the dual surface collimator 310 is configured to provide the dual-direction collimated light at a non-zero propagation angle relative to the horizontal plane of the dual surface collimator 310.

In some embodiments, the dual surface collimator 310 is substantially similar to the above-described dual surface collimator 100. In particular, the dual surface collimator 310 comprises a curved entrance surface and a curved reflector surface. The curved reflector surface is opposite to the curved entrance surface, e.g., on opposite sides of a material of the dual surface collimator 310. Further, the curved entrance surface may be substantially similar to the entrance surface 110 having a curved shape and the curved reflector surface may be substantially similar to the reflector surface 120 having a curved shape described above with respect to the dual surface collimator 100, according to some embodiments.

In particular, the curved entrance surface of the dual surface collimator 310 may be configured to refract incident light toward the curved reflector surface. In turn, the curved reflector surface may be configured to reflect the refracted light back toward the curved entrance surface, and the curved entrance surface may be further configured to re-reflect the reflected light from the curved reflector surface toward a plate light guide (e.g., plate light guide 320, described below) to provide the dual-direction collimated light. According to some embodiments, a combination of a relative orientation and curved shape of each of the curved entrance surface and the curved reflector surface is configured to collimate and redirect the incident light as the dual-direction collimated light having the non-zero propagation direction.

In some embodiments, the curved reflector surface comprises an optical reflector having a parabolic shape or a substantially parabolic shaped profile. The parabolic shape may be configured to determine or provide the non-zero propagation angle of the dual-direction collimated light at an output of the dual surface collimator. Further, for example, the curved reflector surface of the dual surface collimator 310 may comprise an optical reflector having a parabolic shape. The parabolic shape may be shaped (e.g., by optimization), for example.

As illustrated in FIG. 6, the 3D electronic display 300 further comprises a plate light guide 320. The plate light guide 320 is configured to guide the dual-direction collimated light as a guided light beam at the non-zero propagation angle. In particular, the guided light beam may be guided at the non-zero propagation angle relative to a surface (e.g., one or both of a top surface and a bottom surface) of the plate light guide 320. The surface may be parallel to the horizontal plane in some embodiments. According to some embodiments, the plate light guide 320 may be substantially similar to the plate light guide 220 described above with respect to the backlight 200.

According to various embodiments and as illustrated in FIG. 6, the 3D electronic display 300 further comprises an array of multibeam diffraction gratings 330 located at a surface of the plate light guide 320. According to some embodiments, a multibeam diffraction grating 330 of the array may be substantially similar to the multibeam diffraction grating 240 described above with respect to the backlight 200. In particular, a multibeam diffraction grating 330 of the array is configured to diffractively couple out a portion of the guided light beam as plurality of coupled-out light beams having different principal angular directions and representing the light beams 306 in FIG. 6. Moreover, the different principal angular directions of light beams 306 coupled out by the multibeam diffraction grating 330 correspond to different 3D views of the 3D electronic display 300, according to various embodiments. In some embodiments, the multibeam diffraction grating 330 comprises a chirped diffraction grating having curved diffractive features. In some embodiments, a chirp of the chirped diffraction grating is a linear chirp.

In some embodiments, the 3D electronic display 300 (e.g., as illustrated in FIG. 6) further comprises a light source 340 configured to provide light to an input of the dual surface collimator 310. In some embodiments, the light source 340 may be substantially similar to the light source 230 of the backlight 200, described above. In particular, the light source 340 may comprise a plurality of different light emitting diodes (LEDs) configured to provide different colors of light (referred to as 'different colored LEDs' for simplicity of discussion). In some embodiments, the different colored LEDs may be offset (e.g., laterally offset) from one another. The offset of the different colored LEDs is configured to provide different, color-specific, non-zero propagation angles of the dual-direction collimated light from the dual surface collimator 310. Further, a different, color-specific, non-zero propagation angle may correspond to each of the different colors of light provided by the light source 340.

In some embodiments (not illustrated), the different colors of light may comprise the colors red, green and blue of a red-green-blue (RGB) color model. Further, the plate light guide 320 may be configured to guide the different colors as light beams at different color-dependent non-zero propagation angles within the plate light guide 320. For example, a first guided color light beam (e.g., a red light beam) may be guided at a first color-dependent, non-zero propagation angle, a second guided color light beam (e.g., a green light beam) may be guided at a second color-dependent non-zero propagation angle, and a third guided color light beam (e.g., a blue light beam) may be guided at a third color-dependent non-zero propagation angle, according to some embodiments.

As illustrated in FIG. 6, the 3D electronic display 300 may further comprise a light valve array 350. According to various embodiments, the light valve array 350 is configured to modulate the coupled-out light beams 306 of the light beam plurality as the modulated light beams 306' to form or serve as the 3D pixels corresponding to the different 3D views of the 3D electronic display 300. In some embodiments, the light valve array 350 comprises a plurality of liquid crystal light valves. In other embodiments, the light valve array 350 may comprise another light valve including, but not limited to, an electrowetting light valve, an electrophoretic light valve, a combination thereof, or a combination of liquid crystal light valves and another light valve type, for example.

Figure 7:
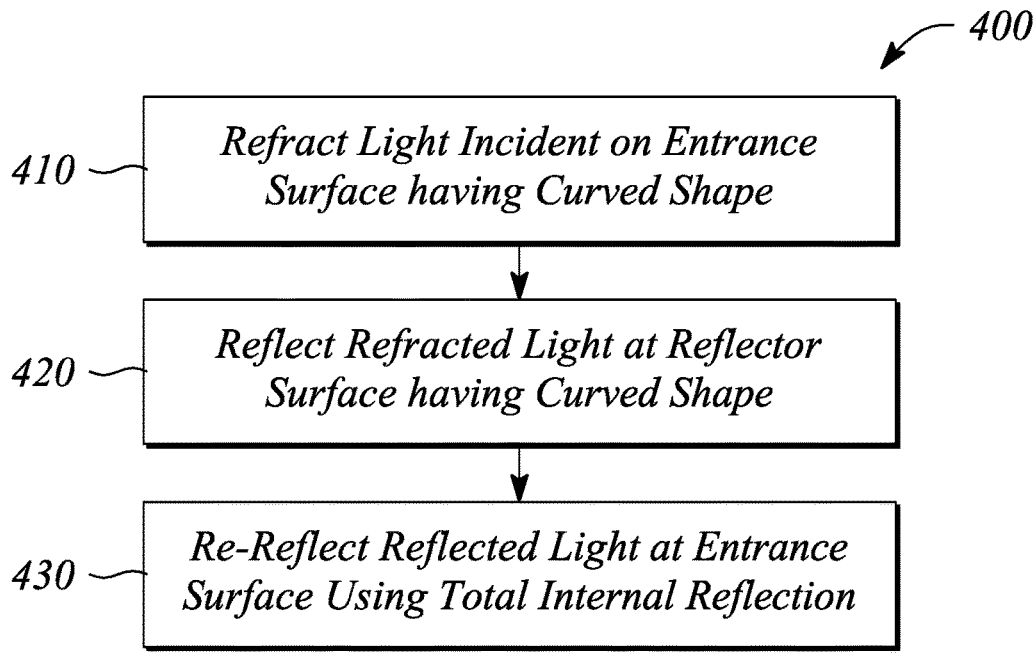
FIG. 7 illustrates a flow chart of a method of dual-direction light collimation in an example, according to an embodiment consistent with the principles described herein.

In accordance with other embodiments of the principles described herein, a method of dual-direction light collimation is provided. FIG. 7 illustrates a flow chart of a method 400 of dual-direction light collimation in an example, according to an embodiment consistent with the principles described herein. As illustrated in FIG. 7, the method 400 of dual-direction light collimation comprises refracting 410 light incident on and passing through an entrance surface of a dual surface collimator. According to various embodiments, the entrance surface has a curved shape. In some embodiments, the entrance surface is substantially similar to the entrance surface 110 having a curved shape described above with respect to the dual surface collimator 100. For example, the entrance surface may have a curved shape that comprises substantially an entire extent of the entrance surface. In other examples, the curved shape comprises a portion of the extent of the entrance surface. In addition, the entrance surface curved shape may be singly curved or doubly curved, in various embodiments.

The method 400 of dual-direction light collimation further comprises reflecting 420 the refracted light at a reflector surface of the dual surface collimator. According to various embodiments, the reflector surface has another curved shape. For example, the other curved shape of the reflector surface may be different from the curved shape of the entrance surface. In some embodiments, the reflector surface is substantially similar to the reflector surface 120 having a curved shape described above with respect to the dual surface collimator 100. For example, the reflector surface may have a parabolic shape. In another example, the reflector surface may comprise a doubly curved surface.

The method 400 of dual-direction light collimation illustrated in FIG. 7 further comprises re-reflecting 430 the reflected light at the entrance surface using total internal reflection. The re-reflected light from re-reflecting 430 is directed toward an output aperture of the dual surface collimator, according to various embodiments. Further, according to various embodiments, the curved shapes and a relative orientation of the entrance surface and the reflector surface in combination are configured to provide dual-direction collimated light at the output aperture. Moreover, the dual-direction collimated light has a non-zero propagation angle relative to a horizontal plane, according to various embodiments.

The non-zero propagation angle may be substantially similar to the non-zero propagation angle described above with respect to the dual surface collimator 100, for example. In some embodiments, the reflector surface curved shape comprises a parabolic shape having a tilt angle configured to provide or at least partially provide the non-zero propagation angle of the dual-direction collimated light. Further, the reflector surface may be coated with a reflective coating, in some embodiments.

Figure 8:
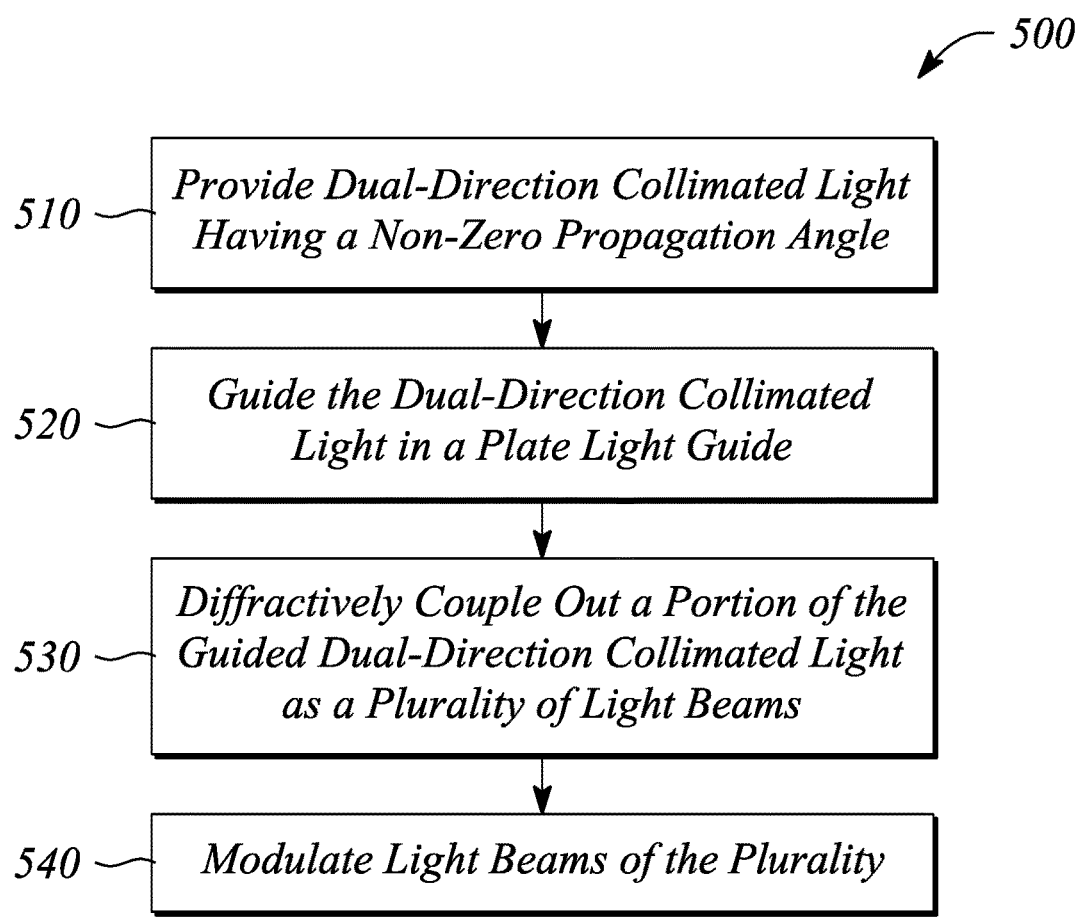
FIG. 8 illustrates a flow chart of a method of 3D electronic display operation in an example, according to an embodiment consistent with the principles described herein.

In accordance with yet other embodiments of the principles described herein, a method of three-dimensional (3D) electronic display operation is provided. FIG. 8 illustrates a flow chart of a method 500 of 3D electronic display operation in an example, according to an embodiment consistent with the principles described herein. As illustrated in FIG. 8, the method 500 of 3D electronic display operation comprises providing 510 dual-direction collimated light having a non-zero propagation angle. According to various embodiments, the dual-direction collimated light is provided 510 using a dual surface collimator. The dual surface collimator may be substantially similar to the dual surface collimator 100 described above. In some embodiments, the dual-direction collimated light may be provided 510 according to the method 400 of dual-direction light collimation, described above. Moreover, the dual-direction collimated light may be substantially similar to the dual-direction collimated light 106 or 204 described above for the dual surface collimator 100 or the backlight 200, respectively.

The method 500 of 3D electronic display operation further comprises guiding 520 the dual-direction collimated light in a plate light guide. In particular, the dual-direction collimated light is guided 520 at the non-zero propagation angle within the plate light guide. According to some embodiments, the plate light guide may be substantially similar to the plate light guide 220 of the backlight 200, as described above.

The method 500 of 3D electronic display operation of FIG. 8 further comprises diffractively coupling out 530 of the plate light guide a portion of the guided dual-direction collimated light using a multibeam diffraction grating to produce a plurality of light beams. According to some embodiments, the multibeam diffraction grating is located at a surface of the plate light guide. According to various embodiments, diffractively coupling out 530 the guided dual-direction collimated light portion is configured to provide the plurality of light beams directed away from the plate light guide in a plurality of different principal angular directions. In particular, the plurality of different principal angular directions corresponds to directions of different 3D views of a 3D electronic display. According to some embodiments, the multibeam diffraction grating is substantially similar to the multibeam diffraction grating 240 of the backlight 200, as described above. The diffractively coupled-out 530 light beams of the light beam plurality correspond to the light beams 206 or 306, described above with respect to the backlight 200 or the 3D electronic display 300, respectively.

According to various embodiments, the method 500 of 3D electronic display operation illustrated in FIG. 8 further comprises modulating 540 light beams of the plurality of light beams using an array of light valves. The modulated 540 light beams form 3D pixels of the 3D electronic display in the 3D view directions, according to various embodiments. In some embodiments, the array of light valves may be substantially similar to the light valve array 350 described above with respect to the 3D electronic display 300.

In some embodiments (not illustrated), the method 500 of 3D electronic display operation further comprises providing light to be collimated in dual directions. For example, the light may be non-collimated light provided to a dual surface collimator, such as the dual surface collimator that may be used in providing 510 dual-direction collimated light. The light may be provided using a light source at an input of the entrance surface of the dual surface collimator, for example. Further, the light source may be substantially similar to the light source 230 described above with respect to the backlight 200, in some embodiments.

Thus, there have been described examples of a dual surface collimator, a backlight and a 3D electronic display that employ a dual surface collimator, a method of dual-direction collimation and a method of 3D electronic display operation that employs dual-direction collimation. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A dual surface collimator comprising:
    an entrance surface having a curved shape, the entrance surface being configured to refract incident light from a light source; and
    a reflector surface opposite to the entrance surface and having another curved shape, the reflector surface being configured to reflect the refracted light back toward the entrance surface, the entrance surface being further configured to re-reflect the reflected light by total internal reflection toward an output aperture of the dual surface collimator,
    wherein the curved shapes and a relative orientation of the entrance surface and the reflector surface, in combination, are configured to convert the incident light into dual-direction collimated light at the output aperture, the dual-direction collimated light having a non-zero propagation angle relative to a horizontal plane of the dual surface collimator.

2. The dual surface collimator of claim 1, wherein the curved shape of the entrance surface is configured to modify a virtual position of a light source, the modified virtual position being relative to a focal point of the reflector surface, the light source being configured to provide the light incident on the entrance surface.

3. The dual surface collimator of claim 1, wherein the curved shape of the entrance surface is configured to substantially extend from the reflector surface to the output aperture of the dual surface collimator.

4. The dual surface collimator of claim 1, wherein the curved shape of the entrance surface is concave and configured to form a cavity to substantially enclose the light source on a substrate.

5. The dual surface collimator of claim 1, wherein the reflector surface curved shape is coated with a reflective coating.

6. A backlight comprising the dual surface collimator of claim 1, the backlight further comprising:
    a plate light guide coupled to the output aperture of the dual surface collimator, the plate light guide having an input aperture configured to receive the dual-direction collimated light, the plate light guide being configured to guide the dual-direction collimated light at the non-zero propagation angle,
    wherein the plate light guide is further configured to emit a portion of the guided dual-direction collimated light from a surface of the plate light guide.

7. The backlight of claim 6, wherein a vertical extent of the dual surface collimator output aperture is greater than a vertical extent of the plate light guide input aperture, an alignment between the plate light guide input aperture and the dual surface collimator output aperture being configured to adjust a characteristic of the dual-direction collimated light to be coupled into the plate light guide at the input aperture.

8. The backlight of claim 6, further comprising a light source configured to provide light to the dual surface collimator, the light source being located adjacent to the curved entrance surface to provide the incident light.

9. The backlight of claim 8, wherein the light source comprises a plurality of different optical sources configured to provide different colors of light, the different optical sources being offset from one another, wherein the offset of the different optical sources is configured to provide different, color-specific, non-zero propagation angles of the dual-direction collimated light corresponding to each of the different colors of light.

10. The backlight of claim 6, further comprising a multibeam diffraction grating at the plate light guide surface, the multibeam diffraction grating being configured to diffractively couple out a portion of the guided, dual-direction collimated light from the plate light guide as a plurality of light beams emitted from the plate light guide surface, a light beam of the light beam plurality having a principal angular direction different from principal angular directions of other light beams of the light beam plurality.

11. A three-dimensional (3D) electronic display comprising the backlight of claim 10, the 3D electronic display further comprising:
    a light valve to modulate a light beam of the light beam plurality, the light valve being adjacent to the multibeam diffraction grating, wherein the principal angular direction of the light beam corresponds to a view direction of the 3D electronic display, the modulated light beam representing a pixel of the 3D electronic display in the view direction.

12. A three-dimensional (3D) electronic display comprising:
a dual surface collimator comprising a curved entrance surface and a curved reflector surface opposite to the curved entrance surface, the dual surface collimator being configured to provide dual-direction collimated light at a non-zero propagation angle;
a plate light guide configured to guide the dual-direction collimated light as a guided light beam at the non-zero propagation angle; and
an array of multibeam diffraction gratings at a surface of the plate light guide, a multibeam diffraction grating of the array being configured to diffractively couple out a portion of the guided light beam as a plurality of coupled-out light beams having different principal angular directions corresponding to directions of different 3D views of the 3D electronic display.

13. The 3D electronic display of claim 12, wherein the curved entrance surface is configured to refract incident light toward the curved reflector surface, the curved reflector surface being configured to reflect the refracted light back toward the curved entrance surface, and wherein the curved entrance surface is further configured to re-reflect the reflected light from the curved reflector surface toward the plate light guide to provide the dual-direction collimated light, a combination of a relative orientation and curved shapes of each of the curved entrance surface and the curved reflector surface is configured to collimate and redirect the incident light as the dual-direction collimated light having the non-zero propagation angle.

14. The 3D electronic display of claim 12, wherein the array of multibeam diffraction gratings comprises a chirped diffraction grating having curved diffractive features.

15. The 3D electronic display of claim 14, wherein the chirped diffraction grating is a linear chirped diffraction grating.

16. The 3D electronic display of claim 12, further comprising:
a light source configured to provide incident light to the curved entrance surface of the dual surface collimator; and
a light valve array configured to selectively modulate the coupled-out light beams of the plurality as 3D pixels corresponding to the different 3D views of the 3D electronic display.

17. The 3D electronic display of claim 16, wherein the light valve array comprises a plurality of liquid crystal light valves.

18. The 3D electronic display of claim 17, wherein the light source comprises a plurality of different light emitting diodes (LEDs) configured to provide different colors of light, the different LEDs being offset from one another, wherein the offset of the different LEDs is configured to provide different color-specific non-zero propagation angles of the dual-direction collimated light, a different color-specific non-zero propagation angle corresponding to each of the different colors of light.

19. The 3D electronic display of claim 18, wherein a vertical extent of an output aperture of the dual surface collimator is greater than a vertical extent of an input aperture of the plate light guide the plate light guide being configured to receive the dual-direction collimated light, an alignment between the plate light guide input aperture and the dual surface collimator output aperture being configured to adjust a relative amount of the different colors of light to be received by the plate light guide input aperture according to the different, color specific, non-zero propagation angles.

20. A method of dual-direction light collimation, the method comprising:
refracting light incident on and passing through an entrance surface of a dual surface collimator, the entrance surface having a curved shape;
reflecting the refracted light at a reflector surface of the dual surface collimator, the reflector surface having another curved shape; and
re-reflecting the reflected light at the entrance surface using total internal reflection, the re-reflected light being directed toward an output aperture of the dual surface collimator,
wherein the curved shapes and a relative orientation of the entrance surface and the reflector surface in combination are configured to provide dual-direction collimated light at the output aperture, the dual-direction collimated light having a non-zero propagation angle relative to a horizontal plane of the dual surface collimator.

21. The method of light collimation of claim 20, wherein the reflector surface curved shape is coated with a reflective coating.

22. A method of three-dimensional (3D) electronic display operation comprising the method of dual-direction light collimation of claim 20, the method of 3D electronic display operation further comprising:
guiding the dual-direction collimated light from the output aperture in a plate light guide at the non-zero propagation angle;
diffractively coupling out a portion of the guided dual-direction collimated light using a multibeam diffraction grating at a surface of the plate light guide to produce a plurality of light beams directed away from the plate light guide in a plurality of different principal angular directions corresponding to directions of different 3D views of a 3D electronic display; and
modulating light beams of the plurality of light beams using an array of light valves, the modulated light beams forming 3D pixels of the 3D electronic display in the different 3D view directions.

* * * * *